No. 821,221. PATENTED MAY 22, 1906.
J. E. COCHRAN & O. L. PLUMTREE.
WEIGHING SCALE.
APPLICATION FILED APR. 6, 1905.

2 SHEETS—SHEET 1.

Witnesses:

Inventors:
Joseph E. Cochran
Oliver L. Plumtree
By Cheever & Cox Attys

No. 821,221. PATENTED MAY 22, 1906.
J. E. COCHRAN & O. L. PLUMTREE.
WEIGHING SCALE.
APPLICATION FILED APR. 6, 1905.

2 SHEETS—SHEET 2.

Witnesses:
W. W. Peet
Geo. Parmann.

Inventors:
Joseph E. Cochran
Oliver L. Plumtree
By Cheever & Cox
Atty's

# UNITED STATES PATENT OFFICE.

JOSEPH E. COCHRAN AND OLIVER L. PLUMTREE, OF CHICAGO, ILLINOIS; SAID PLUMTREE ASSIGNOR TO SAID COCHRAN.

WEIGHING-SCALE.

No. 821,221.     Specification of Letters Patent.     Patented May 22, 1906.

Application filed April 6, 1905. Serial No. 254,090.

*To all whom it may concern:*

Be it known that we, JOSEPH E. COCHRAN and OLIVER L. PLUMTREE, citizens of the United States, residing at Chicago, in the county of Cook and State of Illinois, have invented a certain new and useful Improvement in Weighing-Scales, of which the following is a specification.

The objects of this invention are, first, to provide a simple yet sensitive and accurate scale in which a counterweight is employed to balance the object to be weighed; second, to render the scale of large capacity with the employment of a small weight, and, third, to provide simple and positive means for overcoming the effect of backlash and bringing the pointer accurately to the reading-points. We accomplish these objects by the mechanism illustrated in the accompanying drawings, in which—

Figure 1:
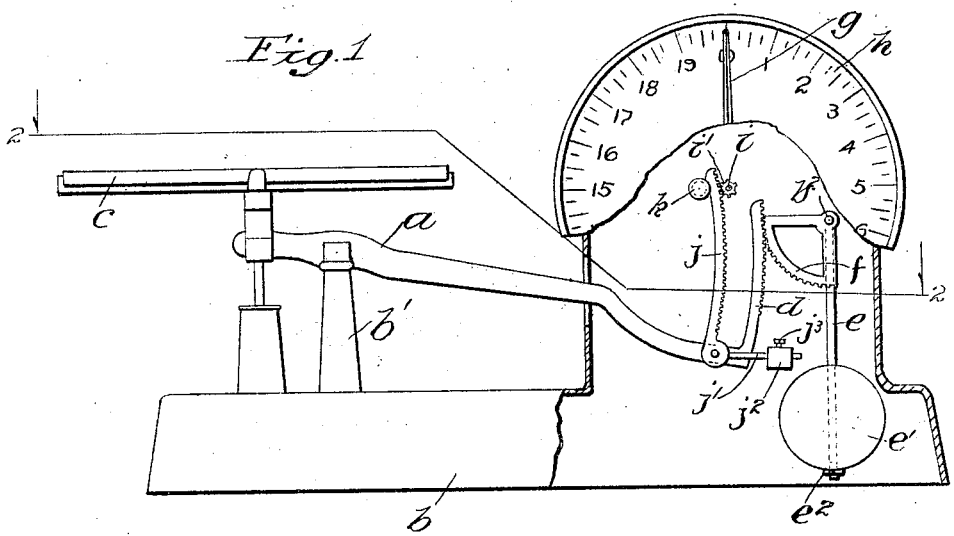
Figure 2:
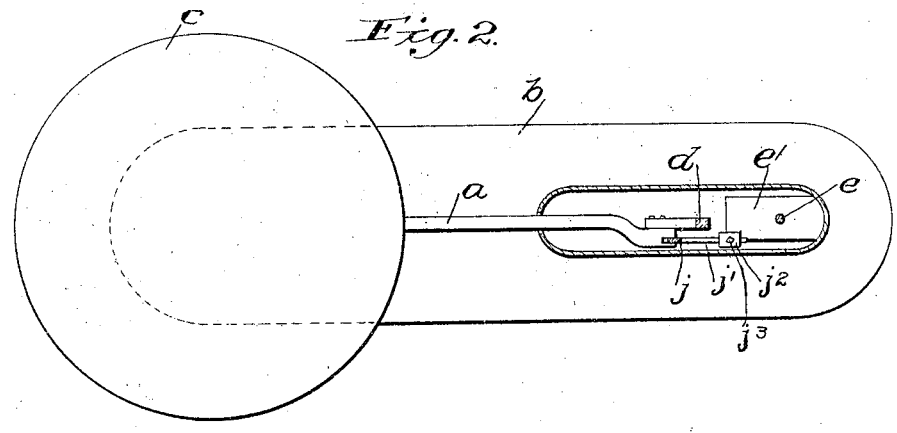
Figure 3:
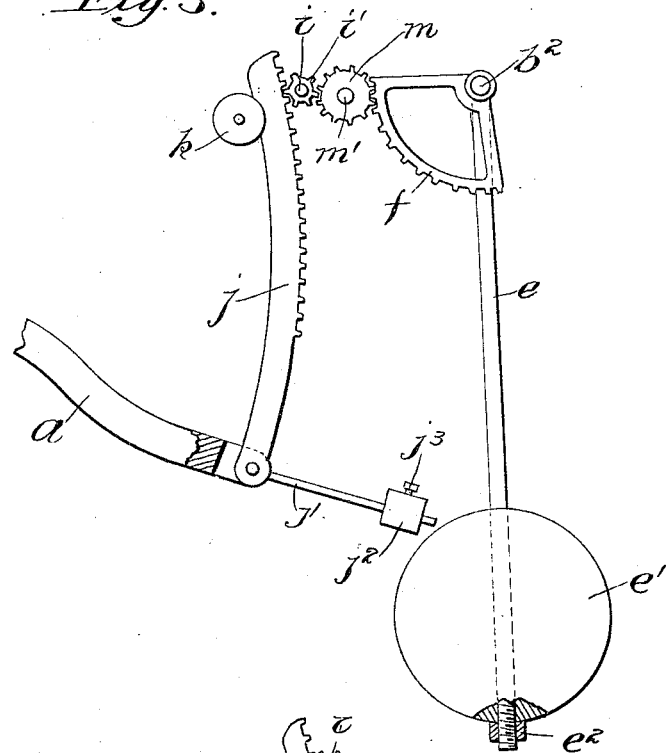
Figure 4:
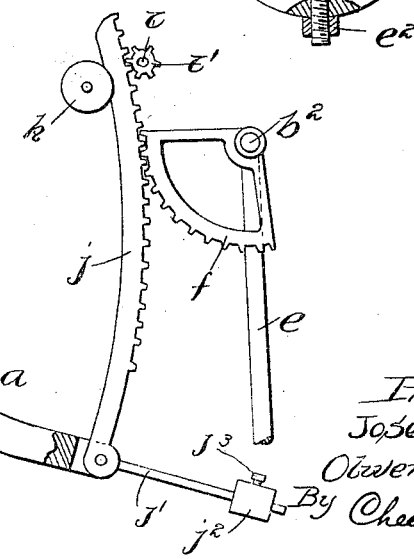

Figure 1 is a side elevation of the complete scale in its preferred form, a portion of the dial and frame being broken away to exhibit the working parts of the mechanism. Fig. 2 is a plan view of the scale, partly in section, on the line 2 2, Fig. 1. Fig. 3 is a fragmentary detail view showing a modification in the manner of connecting the segment of the weighted arm to the rack on the scale-beam. Fig. 4 is a fragmentary view showing another modification in which the segment on the weighted arm is geared directly to the rack on the scale-beam, and the pinion on the pointer-shaft is also geared to said rack.

Similar letters refer to similar parts throughout the several views.

Referring to the form of mechanism shown in Figs. 1 and 2, $a$ represents the scale-beam, which is fulcrumed upon the post $b'$ of the machine-frame $b$. Said beam is fulcrumed between its ends and at one end carries the scale-pan, and consequently when an object to be weighed is placed upon said pan the opposite end of the scale-beam tends to rise. The rack $d$ is secured to the scale-beam on the side of the fulcrum opposite to pan $c$ and in the present construction is rigidly secured at the extremity of the beam and is curved in such manner that its toothed edge is circular and concentric with the fulcrum of the scale-beam. The arm $e$ is pivoted upon the shaft or pin $b^2$, fixed in the framework $b$, and has a weight $e'$ attached thereto for counterbalancing the object to be weighed. It is desirable to provide means whereby said weight $e'$ may be adjusted upon the arm $e$, and a suitable form of adjusting means is shown in Fig. 1, where the extremity of arm $e$ is threaded and carries an adjusting-nut $e^2$. A toothed segment $f$ is rigidly secured or connected to arm $e$ in such manner that its toothed edge is concentric with the fixed shaft or pin $b^2$. The parts are so arranged and proportioned that segment $f$ meshes with rack $d$, the point of engagement lying between the scale-beam fulcrum and the shaft $b^2$. As a result of this arrangement the arm $e$ and counterweight $e'$ will swing toward the scale-pan during weighing, with a resulting economy in space required for the operation of the mechanism.

When the scale-pan is in normal or zero position with no weight thereon, arm $e$ will lie pendent; but when an object is placed upon the scale-pan the arm $e$ and weight $e'$ thereon will tend to be swung inward and toward horizontal position. As is well known, the leverage or torsion of the counterweight $e'$ upon arm $e$ and segment $f$ will increase as the arm $e$ approaches more nearly to horizontal position, and these parts will therefore counterbalance the weight of the object in the scale-pan. In order to give large capacity to the scale, it is desirable that the distance between the scale-beam fulcrum and rack $d$ should be greater than the distance between said fulcrum and the point of support of pan $c$ and also that the radius of the segment $f$ should be less than the distance between shaft $b^2$ and the center of gravity of counterweight $e'$.

In the present form of scale the reading means consists of a pointer $g$, adapted to rotate in front of the dial $h$. Said pointer is mounted upon the horizontal shaft $i$, journaled in the framework $b$, and has rigidly secured thereto a pinion $i'$. Said pinion is rotated by means of a rack $j$, which is pivotally connected to the scale-beam and is influenced to approach said pinion by means of the arm $j'$, which is rigidly secured to rack $j$ and so designed as to lie approximately horizontal. On said arm is a weight $j^2$, which by preference is adjustable on said arm and may be secured in proper position thereon by means of the set-screw $j^3$. A guard or keeper $k$ is fixed to the framework $b$ at a point slightly behind rack $j$, the distance being sufficient to permit said rack to recede slightly from pinion $i$, so that the parts may intermesh loosely, but the distance being insufficient to permit rack $j$ from becoming disengaged from said pinion. It is desirable that the pitch-line of rack $j$ be circular and concentric with the scale-beam fulcrum.

In operation an object upon the scale-pan will raise the rack $d$, which will in turn rotate the segment $f$ and swing the counterweight $e'$ up toward horizontal position, the amount of swing depending upon the weight of the object in the scale-pan. The upward motion of the scale-beam will also raise the rack $j$ and rotate pinion $i$ and pointer $g$ an amount corresponding to the weight of the object in the scale-pan. The teeth on rack $j$ and pinion $i'$ are preferably involute, and when said rack moves upward, especially if the movement be rapid, there will be a tendency for said rack to be forced away from pinion $i'$. A slight amount of recession is an advantage, as the parts will then be more loose and the friction will be correspondingly reduced. The pin $k$, however, will prevent actual disengagement of the rack from the pinion. When the scale-beam has risen to the position in which there is a balance, the weight $j^2$, acting upon rack $j$, will influence said rack to closely approach pinion $i'$. This will cause said rack to bind the pinion somewhat tightly, thus eliminating backlash and bringing the pointer $g$ to absolutely-correct position. This construction of the pivoted and weight-influenced rack $j$ is of great importance and advantage, for it automatically permits the loosening of the rack from the pinion while the scale-beam is moving and then automatically causes the tightening of the rack against the pinion when the scale-beam is brought to rest in balanced position. It will be noted that the construction is extremely simple, rack $j$ and arm $j'$ virtually constituting a single piece and the mechanism being devoid of springs or other sources of inaccuracy and danger of breakage.

Referring to the form of device shown in Fig. 3, the construction in general and in theory is the same as before, but of the racks $d$ and $j$ one is eliminated and the remaining one caused to serve the double purpose. Here the rack $j$ is pivoted to the scale-beam, as before, and meshes with pinion $i'$; but the segment $f$ instead of being driven by a separate rack is driven by the pinion $i'$, acting through the agency of pinion $m$, which is mounted upon the fixed shaft $m'$ and serves as an idler to obtain the proper relative movements of arm $e$ and scale-beam $a$. The chief object of said idler-pinion $m$ is to cause arm and weight $e'$ to swing inward toward the machine when it moves from the zero or pendent position. The advantage of the movement of arm $e$ in such direction is mechanical merely because it renders the machine more compact. The chief advantage of the form of device shown in Fig. 3 is that a single rack is made to perform the double functions of racks $d$ and $j$ of the form shown in Fig. 1.

Referring to Fig. 4, the arrangement is analogous to the one shown in Fig. 3, with the exception that the idler $m$ is omitted and both pinion $i'$ and segment $f$ mesh directly with rack $j$. The advantage in this last-described form over the form shown in Fig. 3 is that the extra wheel $m$ is omitted, with the consequent elimination of backlash.

What we claim as new, and desire to secure by Letters Patent, is—

In a weighing-scale, the combination, with the scale-beam and beam-support of a weighted arm, a toothed segment rigid with said arm, a rack rigidly secured to said scale-beam and meshing with said segment, a second rack upon said beam, a rotatable reading member and a pinion for rotating the latter, said second rack meshing with said pinion for rotating it and the reading member.

In witness whereof we have hereunto subscribed our names in the presence of two witnesses.

JOSEPH E. COCHRAN.
OLIVER L. PLUMTREE.

Witnesses:
  DWIGHT B. CHEEVER,
  HOWARD M. COX.